(12) United States Patent
Deters et al.

(10) Patent No.: US 10,848,501 B2
(45) Date of Patent: Nov. 24, 2020

(54) REAL TIME PIVOTING ON DATA TO MODEL GOVERNANCE PROPERTIES

(71) Applicant: MICROSOFT TECHNOLOGY LICENSING, LLC, Redmond, WA (US)

(72) Inventors: John Deters, Seattle, WA (US); Ben Appleby, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 151 days.

(21) Appl. No.: 15/471,243

(22) Filed: Mar. 28, 2017

(65) Prior Publication Data

US 2018/0191730 A1  Jul. 5, 2018

Related U.S. Application Data

(60) Provisional application No. 62/440,934, filed on Dec. 30, 2016.

(51) Int. Cl.
*H04L 29/06* (2006.01)
*G06F 16/28* (2019.01)
(Continued)

(52) U.S. Cl.
CPC .......... *H04L 63/105* (2013.01); *G06F 16/285* (2019.01); *G06F 16/9535* (2019.01);
(Continued)

(58) Field of Classification Search
CPC . H04L 63/105; H04L 63/102; H04L 63/1441; H04L 63/10; H04L 63/145;
(Continued)

(56) References Cited

U.S. PATENT DOCUMENTS

| 8,464,335 B1 | 6/2013 | Sinha et al. |
| 8,577,823 B1 | 11/2013 | Gadir |

(Continued)

FOREIGN PATENT DOCUMENTS

| WO | 2016138067 A1 | 9/2016 |
| WO | 2016138566 A1 | 9/2016 |

OTHER PUBLICATIONS

"Enterprise Data Analytics", http://www.alteryx.com/analytics/enterprise-data-analytics, Retrieved on: Feb. 21, 2017, 1 pages.
(Continued)

*Primary Examiner* — Meng Li
(74) *Attorney, Agent, or Firm* — Michael Best & Friedrich LLP

(57) ABSTRACT

Real time pivoting on data to model governance properties is provided. A data explorer module of a security and compliance service may analyze data, metadata, and activities associated with a tenant or a hosted service to understand the data, identify uncategorized data, and determine applicable policies and/or remediation actions in case of sensitive data that may need protection. The data may be stored and managed by a data insights platform which may enable query-based analyses on correlated, multi-stage evaluated data. Thus, the data may be analyzed, additionally, considering metadata, activities associated with the data, etc. In addition to the data, metadata, and activities, the data explorer module may receive information associated with existing classifications, properties, access, and applied policies. Upon evaluation of the data based on the received/stored factors, the data explores module may identify the data and determine applicable policies or actions.

17 Claims, 13 Drawing Sheets

(51) Int. Cl.
*G06F 16/9535* (2019.01)
*G06F 21/55* (2013.01)
*G06F 21/57* (2013.01)
*G06F 21/62* (2013.01)

(52) U.S. Cl.
CPC .......... *G06F 21/552* (2013.01); *G06F 21/577* (2013.01); *G06F 21/6218* (2013.01); *H04L 63/102* (2013.01)

(58) Field of Classification Search
CPC ................ H04L 63/1433; H04L 63/20; G06F 17/30867; G06F 21/6218; G06F 21/577; G06F 21/552; G06F 17/30598; G06F 21/50; G06F 3/0619; G06F 21/71; G06F 12/1441; G06F 3/0644; G06F 3/0659; G06F 2221/031; G06F 2212/1052; G06F 2221/032; G06F 2221/034; G06F 21/554; G06F 16/285; G06F 16/9535
See application file for complete search history.

(56) References Cited

U.S. PATENT DOCUMENTS

| | | |
|---|---|---|
| 9,092,616 B2 | 7/2015 | Kumar et al. |
| 9,100,422 B1 | 8/2015 | Tidwell et al. |
| 9,117,027 B2 | 8/2015 | Dayal et al. |
| 9,203,723 B2 | 12/2015 | Matthews et al. |
| 9,386,033 B1 | 7/2016 | Rossman |
| 9,438,648 B2 | 9/2016 | Asenjo et al. |
| 9,444,819 B2 | 9/2016 | Muppidi et al. |
| 9,509,711 B1 | 11/2016 | Keanini et al. |
| 9,692,778 B1 | 6/2017 | Mohanty |
| 10,230,749 B1 | 3/2019 | Rostami-Hesarsorkh et al. |
| 2002/0091940 A1 | 7/2002 | Welborn et al. |
| 2005/0065807 A1 | 3/2005 | Deangelis et al. |
| 2009/0307755 A1 | 12/2009 | Dvorak et al. |
| 2010/0319004 A1 | 12/2010 | Hudson et al. |
| 2012/0072985 A1 | 3/2012 | Davne et al. |
| 2012/0185945 A1 | 7/2012 | Andres et al. |
| 2012/0210434 A1 | 8/2012 | Curtis et al. |
| 2013/0346294 A1* | 12/2013 | Faith .................. G06Q 20/4016 705/39 |
| 2014/0181982 A1 | 6/2014 | Guo et al. |
| 2014/0289793 A1 | 9/2014 | Moloian et al. |
| 2014/0297569 A1 | 10/2014 | Clark et al. |
| 2015/0067761 A1 | 3/2015 | Bade et al. |
| 2015/0163199 A1 | 6/2015 | Kailash et al. |
| 2015/0172321 A1* | 6/2015 | Kirti ...................... H04L 63/20 726/1 |
| 2015/0178135 A1 | 6/2015 | Wang |
| 2015/0319185 A1 | 11/2015 | Kirti et al. |
| 2015/0324606 A1 | 11/2015 | Grondin et al. |
| 2016/0112453 A1 | 4/2016 | Martinez et al. |
| 2016/0119357 A1 | 4/2016 | Kinsella et al. |
| 2016/0127418 A1 | 5/2016 | Maes et al. |
| 2016/0142433 A1 | 5/2016 | Nasu |
| 2016/0156671 A1 | 6/2016 | Cabrera et al. |
| 2016/0173500 A1 | 6/2016 | Sharabi et al. |
| 2016/0248799 A1 | 8/2016 | Ng et al. |
| 2016/0255117 A1 | 9/2016 | Sinha et al. |
| 2016/0306965 A1 | 10/2016 | Iyer et al. |
| 2016/0335303 A1 | 11/2016 | Madhalam et al. |
| 2016/0359915 A1* | 12/2016 | Gupta ..................... H04L 43/04 |
| 2017/0034196 A1 | 2/2017 | Chauhan et al. |
| 2017/0041206 A1 | 2/2017 | Maes et al. |
| 2017/0116426 A1 | 4/2017 | Pattabhiraman et al. |
| 2017/0187739 A1 | 6/2017 | Spiro et al. |
| 2017/0223040 A1 | 8/2017 | Ikuse et al. |
| 2017/0236131 A1 | 8/2017 | Nathenson et al. |
| 2017/0289178 A1 | 10/2017 | Roundy et al. |
| 2017/0329991 A1 | 11/2017 | Van dyne et al. |
| 2018/0189517 A1 | 7/2018 | Larson et al. |
| 2018/0191771 A1 | 7/2018 | Newman et al. |
| 2018/0191781 A1 | 7/2018 | Palani et al. |
| 2018/0232779 A1 | 8/2018 | Nordholm et al. |
| 2020/0159959 A1 | 5/2020 | Larson et al. |

OTHER PUBLICATIONS

Hassanzadeh, et al., "Helix: Online Enterprise Data Analytics", In Proceedings of the 20th international conference companion on World wide web, Mar. 28, 2011, 4 pages.

Kandel, et al., "Enterprise Data Analysis and Visualization: An Interview Study", In Journal of IEEE Transactions on Visualization and Computer Graphics, vol. 18, No. 12, Dec. 2012, 10 pages.

"International Search Report and Written Opinion Issued in PCT Application No. PCT/US2017/066239", dated Feb. 2, 2018, 11 Pages.

"Alert Logic", Retrieved From: https://www.alertlogic.com/solutions/alertlogic-technology/activewatch/, Feb. 27, 2017, 6 Pages.

"Alert Logic Security-As-A-Service", Retrieved From: https://c368768.ssl.cf1.rackcdn.com/product_files/19358/original/AL_vCloudAir_ISV_CoBrand_Finaldf447a93ccbd89028bec0ea470b3906f.pdf, Feb. 27, 2017, 2 Pages.

"Consul InSight Security Manager", Retrieved From: http://jdcmg.isc.ucsb.edu/docs/secpresent/IBM-BR-Consul-InSight2.pdf, Aug. 18, 2014, 2 Pages.

"Cyber Threat Intelligence", Retrieved From: https://www2.deloitte.com/content/dam/Deloitte/lu/Documents/risk/lu-cyber-threat-intelligence-cybersecurity-29102014.pdf, Nov. 23, 2015, pp. 44-49.

"Endpoint security", Retrieved From: http://www-03.ibm.com/software/products/en/category/endpoint-security, Mar. 1, 2017, 2 Pages.

"Managed Security Services: SIEM", Retrieved From: http://www.tatacommunications.com/sites/default/files/MSS-SIEM-Datasheet-47073_0.pdf, Feb. 17, 2017, 2 Pages.

"Oracle Security Monitoring and Analytics Cloud Service", Retrieved From: https://cloud.oracle.com/opc/paas/datasheets/OMC_SMA_DataSheet.pdf, Feb. 27, 2017, 3 Pages.

"Overview of Security Operations Center Technologies", Retrieved From: http://www.ciscopress.com/articles/article.asp?p=2455014&seqNum=3, Dec. 15, 2015, 2 Pages.

"Protect and Audit Sensitive Data", Retrieved From: http://teleran.com/wp-content/uploads/2016/12/Data-Security-and-Compliance-Solution-Teleran-Data-Sheet.pdf, Feb. 27, 2017, 5 Pages.

"Protecting corporate credentials against today's threats", In White Paper of IBM, Sep. 2014, pp. 1-8.

"SIEM Solutions from McAfee", Retrieved From: https://lwww.mcafee.com/in/resources/data-sheets/ds-siem-solutions-from-mcafee.pdf, Feb. 27, 2017, 3 Pages.

"Speed Malware Incident Response with Better Traffic Insight and Context from Gigamon and Plixer", Retrieved From: https://www.gigamon.com/content/dam/resource-library/english/technology-partner-solution-brief/js-plixer-gigamon.pdf, Feb. 27, 2017, 2 Pages.

"Threatprotect", Retrieved From: https://www.qualys.com/docs/threatprotect-datasheet.pdf, Mar. 1, 2017, pp. 1-3.

"Trend Micro Deep Security", In White Paper of Trend Micro, Aug. 2009, 13 Pages.

"Non Final Office Action Issued in U.S. Appl. No. 15/462,466", dated Nov. 2, 2018, 21 Pages.

"Non Final Office Action Issued in U.S. Appl. No. 15/473,998", dated Nov. 16, 2018, 13 Pages.

Alym, Rayani, "Applying intelligence to security and compliance in Office 365", Retrieved From: https://www.microsoft.com/en-in/microsoft-365/blog/2016/09/26/applying-intelligence-to-security-and-compliance-in-office-365/, Sep. 26, 2016, 9 Pages.

Chen, et al., "Collaborative network security in multi-tenant data center for cloud computing", In Proceedings of Tsinghua Science and Technology, vol. 19, Issue 1, Feb. 2014, 3 Pages.

Dupoint, Guillaume, "Threat Intelligence and SIEM (Part 1)—Reactive Security", Retrieved From: https://www.recordedfuture.com/siem-threat-intelligence-part-1/,, Jan. 19, 2016, 8 Pages.

Hashizume, et al., "An analysis of security issues for cloud computing", In Journal of Internet Services and Applications, vol. 4, Issue 5, Feb. 27, 2013, 20 Pages.

(56) References Cited

OTHER PUBLICATIONS

Hoff, et al., "Security Guidance for Critical Areas of Focus in Cloud Computing", https://downloads.cloudsecurityalliance.org/assets/research/security-guidance/csaguide.v3.0.pdf, 2011, 177 Pages.
Kavanagh, et al., "2016 Magic Quadrant for SIEM", Retrieved From: https://securelink.be/wp-content/uploads/sites/7/2016-Magic-Quadrant-for-SIEM.pdf, Aug. 10, 2016, 30 Pages.
Lord, Nate, "What is Threat Intelligence? Finding the Right Threat Intelligence Sources for Your Organization", Retrieved From: https://digitalguardian.com/blog/what-threat-intelligence-finding-right-threat-intelligence-sources-your-organization, Oct. 11, 2016, 4 Pages.
Mullaney, et al., "Multi-tenant applications with elastic database tools and row-level security", Retrieved from: https://docs.microsoft.com/en-us/azure/sql-database/sql-database-elastic-tools-multi-tenant-row-level-security, Apr. 27, 2016, 11 Pages.
"International Search Report & Written Opinion Issued in PCT Patent Application No. PCT/US17/066238", dated Feb. 12, 2018, 9 Pages.
"International Search Report and Written Opinion Issued in PCT Application No. PCT/US2017/068388", dated Feb. 27, 2018, 11 Pages.
Pepelnjak, Ivan, et al., "Cloud Security: Ensuring multi-tenant security in cloud services", http://searchtelecom.techtarget.com/tip/Cloud-Security-Ensuring-multi-tenant-security-in-cloud-services, Mar. 1, 2011, 6 Pages.
Schnitzer, et al., "Meeting Risk and Compliance Requirements While Expanding the Business Value of Data-Intensive Applications", Retrieved From: http://teleran.com/wp-content/uploads/2017/01/Meeting-GRC-Demands_Improving-Business-Value_Teleran-Case-Study.pdf, Feb. 27, 2017 (Retrieved on), 12 Pages.
"Non Final Office Action Issued in U.S. Appl. No. 15/474,042", dated Jun. 13, 2019, 19 Pages.
"Final Office Action Issued in U.S. Appl. No. 15/462,466", dated May 10, 2019, 18 Pages.
"Final Office Action Issued in U.S. Appl. No. 15/473,998", dated Mar. 15, 2019, 12 Pages.
"Non Final Office Action Issued in U.S. Appl. No. 15/473,998", dated Aug. 19, 2019, 14 Pages.
"Notice of Allowance Issued in U.S. Appl. No. 15/462,466", dated Sep. 13, 2019, 12 Pages.
"Final Office Action Issued in U.S. Appl. No. 15/474,042", dated Dec. 9, 2019, 19 Pages.

* cited by examiner

REAL TIME PIVOTING ON DATA TO MODEL GOVERNANCE PROPERTIES

CROSS-REFERENCE TO RELATED APPLICATION

This application claims the benefit under 35 U.S.C. § 119(e) of U.S. patent application Ser. No. 62/440,934 filed on Dec. 30, 2016. The U.S. Patent Application is herein incorporated by reference in its entirety.

BACKGROUND

Hosted services provided by tenants of service providers to their users, such as companies to their employees or organizations to their members, are an increasingly common software usage model. Hosted services cover a wide range of software applications and systems from cloud storage to productivity, and collaboration to communication. Thus, any number of users may utilize applications provided under a hosted service umbrella in generating, processing, storing, and collaborating on documents and other data.

The usage of such hosted services and handling of data may be subject to regulatory, legal, industry, and other rules. Depending on the particular service, handled data, organization type, and many other factors, different rules may be applicable. Thus, it is a challenging endeavor for system administrators to manage all data associated with a tenant or hosted service, determine applicable policies and configurations for their organization, configure systems, and implement the applicable policies and configurations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to real time pivoting on data to model governance properties. A data explorer module associated with a hosted service may be configured to analyze data in a tenant's environment, where the data is stored in a correlated, multi-stage evaluated structure. The data explorer module may receive information such as classification, properties, applied policy(ies), and access in conjunction with the data and analyze the data in light of these factors. The data explorer module may then determine labels, applicable policies, and/or remediation actions for the analyzed data based on the analysis.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
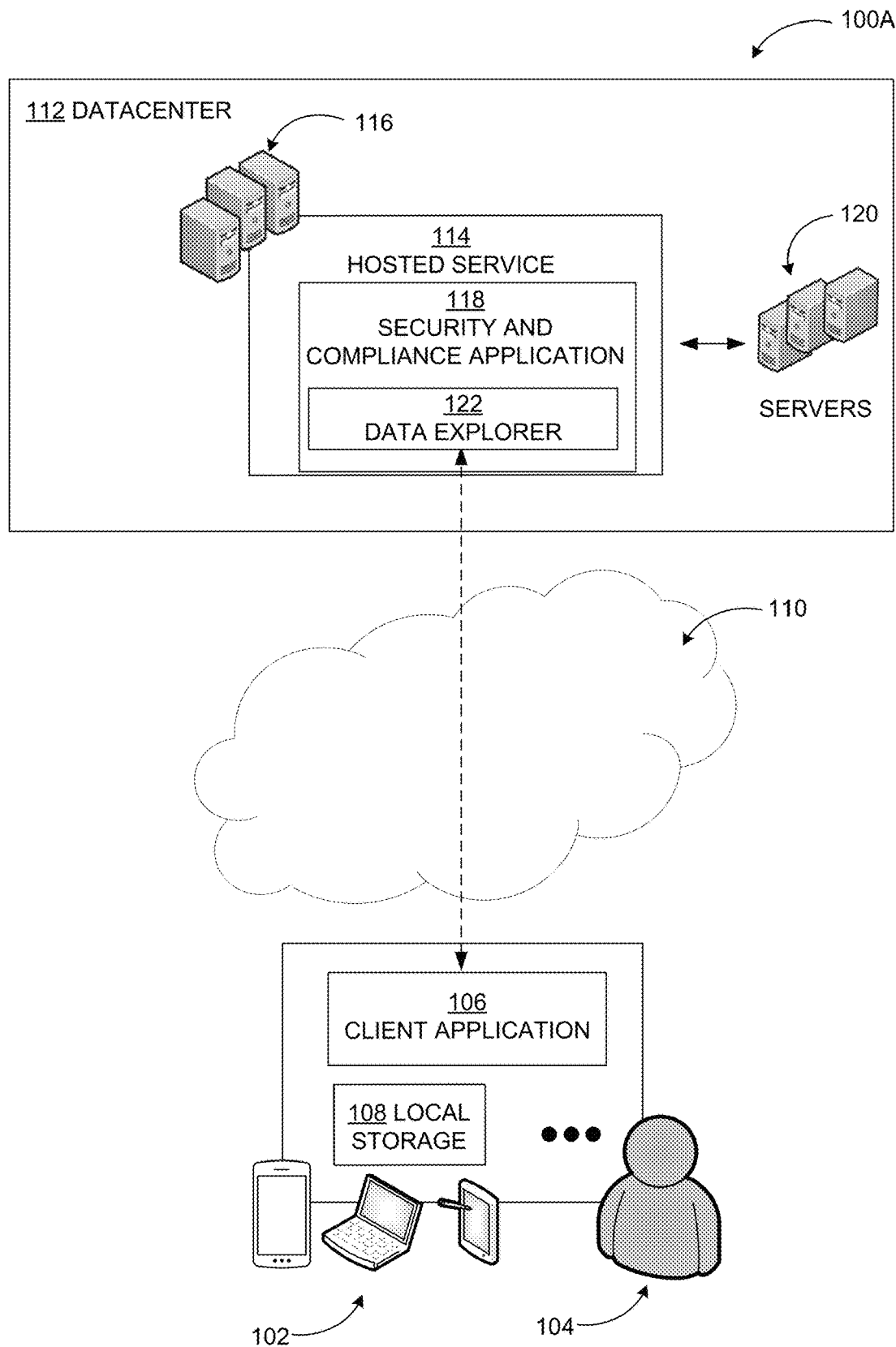
FIGS. 1A through 1C include display diagrams illustrating an example network environment where a system to provide real time pivoting on data to model governance properties may be implemented.

As briefly described above, embodiments are directed to real time pivoting on data to model governance properties. In some examples, a data explorer module of a security and compliance service may analyze data, metadata, and activities associated with a tenant or a hosted service in order to understand the data, identify uncategorized data, and determine applicable policies and/or remediation actions in case of sensitive data that may need protection. The data may be stored and managed by a data insights platform which may enable query-based analyses on correlated, multi-stage evaluated data. Thus, the data may not be analyzed based on its type or origin only, but in light of metadata, activities associated with the data, etc. In addition to the data, metadata, and activities, the data explorer module may receive (or already store) information associated with existing classifications (labels, sensitive data types, etc.), properties (age, type, etc.), access (storage location, access location, external/internal sharing, accessing people/entities, etc.), and applied policies. Upon evaluation of the data based on the received/stored factors, the data explorer module may identify the data types e.g., label it) and determine applicable policies or actions.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing real time pivoting on data to model governance properties. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
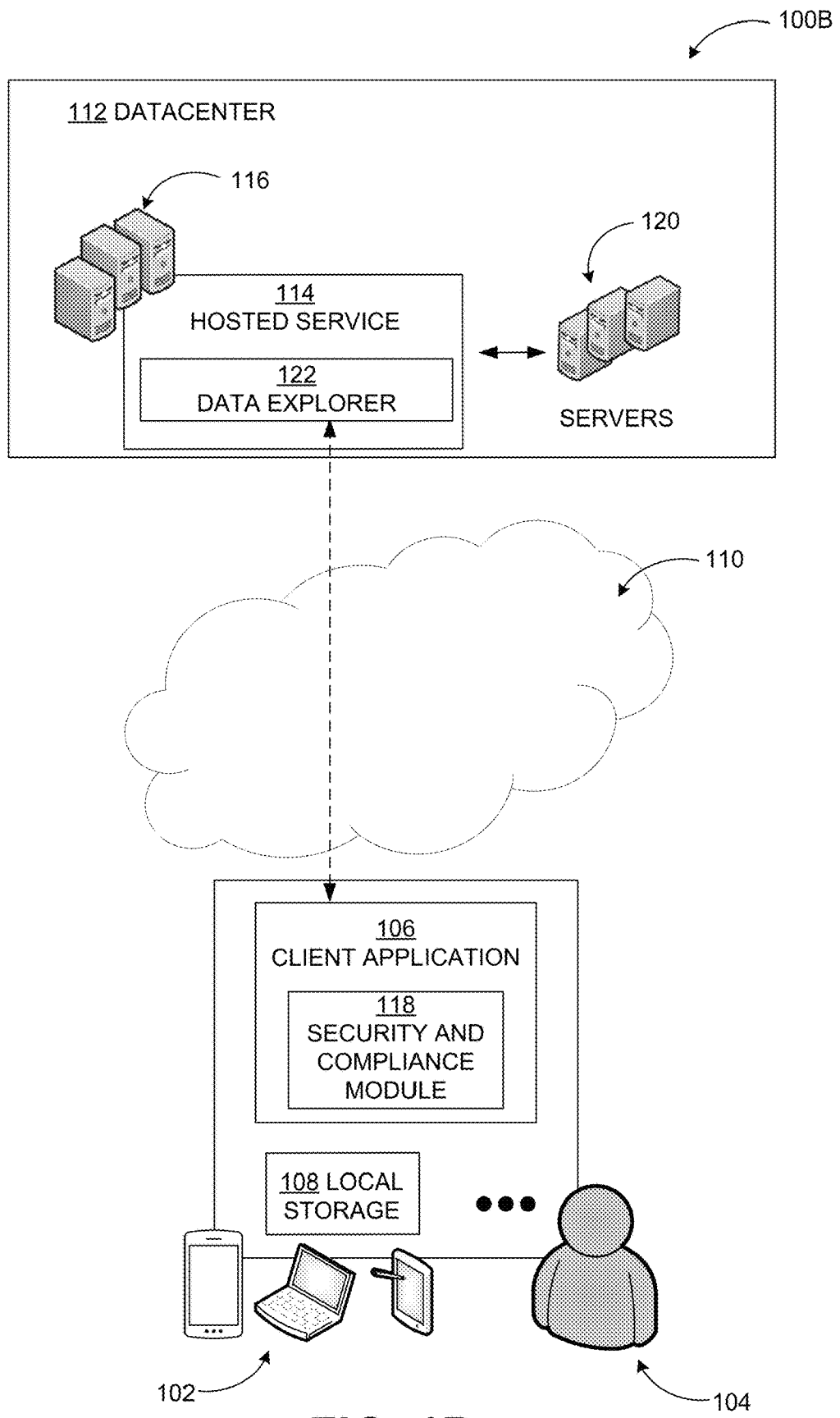
Figure 1C:
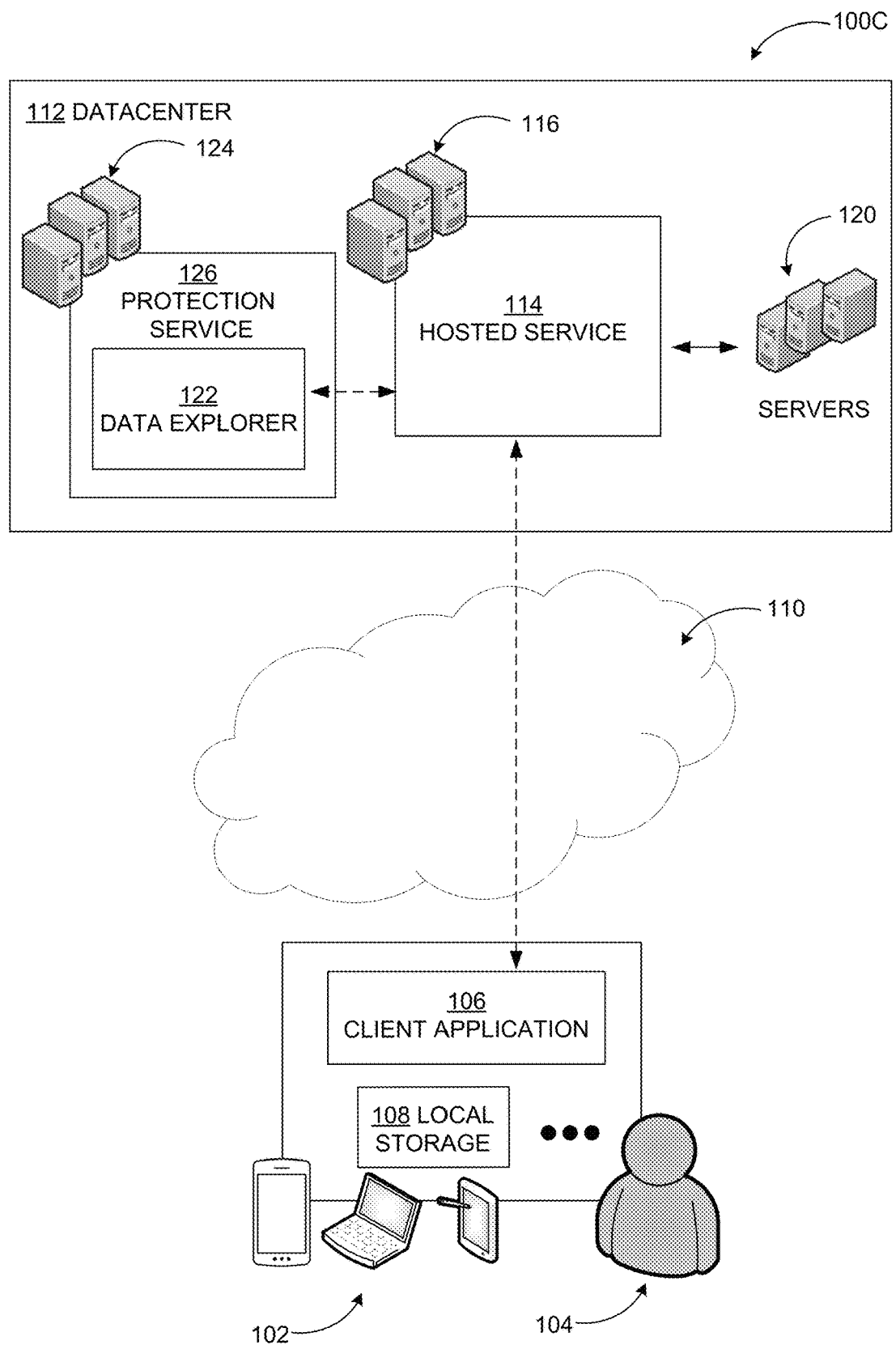

FIGS. 1A through 1C include display diagrams illustrating an example network environment where a system to provide real time pivoting on data to model governance properties may be implemented.

As illustrated in diagrams 100A-100C, an example system may include a datacenter 112 executing a hosted service 114 on at least one processing server 116, which may provide productivity, communication, cloud storage, collaboration, and comparable services to users in conjunction with other servers 120, for example. The hosted service 114 may further include scheduling services, online conferencing services, and comparable ones. The hosted service 114 may be configured to intemperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the hosted service 114 may allow users to access its services through the client application 106 executed on the client devices 102. In other examples, the hosted service 114 may be provided to a tenant (e.g., a business, an organization, or similar entities), which may configure and manage the services for their users.

In one embodiment, as illustrated in diagram 100A, the processing server 116 may be operable to execute a security and compliance application 118 of the hosted service 114, where the security and compliance application 118 may be integrated with the hosted service 114 to provide data management, security, threat management, data storage and processing compliance, and similar services. The security and compliance application 118 may include a data explorer module 122 configured to analyze data associated with the hosted service 118, determine a label, an applicable policy, and a remediation action for the data based on analysis results, and provide a dashboard for users/administrators to view analysis results and accept/take actions based on suggestions.

In another embodiment, as illustrated in diagram 100B, the security and compliance module 118 may be executed at a client device 102 in conjunction with the client application 106. The data explorer module 122 may still be within the hosted service 114 receiving and monitoring data and activities throughout the hosted service 114 and providing the above-mentioned services. In a further embodiment, as illustrated in diagram 100C, the data explorer module 122 may be integrated with a separate protection service 126 and executed by one or more processing servers 124 of the protection service 126. The protection service 126 may be configured to serve the hosted service 114 and/or multiple applications associated with the hosted service 114, such as the client application 106. Furthermore, the protection service 126 may provide its services to multiple hosted services. Thus, if a tenant subscribes to multiple hosted services, common information (e.g., analysis results, user profiles, data and metadata) may be used to coordinate suggested policies and configurations reducing duplication of policy implementation burden on the administrators. As described herein, the hosted service 114, the security and compliance application 118, the data explorer module 122, and the protection service 126 may be implemented as software, hardware, or combinations thereof.

In some embodiments, the data explorer module 122 may be configured to receive attribute information such as a label, a sensitive data type, a data type, an age, a storage location of the data, a location of a user accessing the data, an identity of a user or an entity accessing the data, and whether the data is shared internally or externally for data stored in a correlated and multi-stage evaluated storage structure of for the hosted service 114. The attribute information may be generalized as classification, property, applied policy, and access. The data explorer 122 may present a dashboard with one or more actionable visualizations representing distinct attributes of the data and upon receiving selections of attribute filters for the data through the dashboard, analyze the filtered data based on the received attribute information. The module may also determine a label, an applicable policy, and/or a remediation action for the data based on the analysis results. The determined label, applicable policy, and/or remediation action may be presented through the dashboard.

Based on the analysis, the data explorer module 122 may suggest a policy or remediation action to be implemented in some examples. The suggestion may be to customize or update a currently implemented policy or configuration. The suggestion may encompass regulatory, legal, industrial, internal compliance, external compliance, and other security and compliance rules or standards employed to protect the tenant, for example.

As previously discussed, hosted services provided by tenants of service providers to their users are an increasingly common software usage model because it allows any number of users to utilize applications provided under the hosted service umbrella in generating, processing, storing, and collaborating on documents and other data. The usage of hosted services may include processing and storage or large amounts of data, which may be subject to regulatory, legal, industry, and other rules, internal and external threats, etc. Thus, it is a challenging endeavor for system administrators to determine different categories of data, applicable policies and rules tar the categories, configure systems, and implement the applicable policies and take remediation actions. Implementation of real time pivoting on data to model governance properties as described herein may allow tenants of a hosted service to understand their data, determine their security and compliance needs, configure their systems, implement new policies, and customize user interfaces in an efficient manner. Through these technical advantages, processing and network capacity may be preserved, data security may be enhanced, usability may be improved, and user interactivity may be increased.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large numbers of devices and users using hosted services.

Figure 2A:
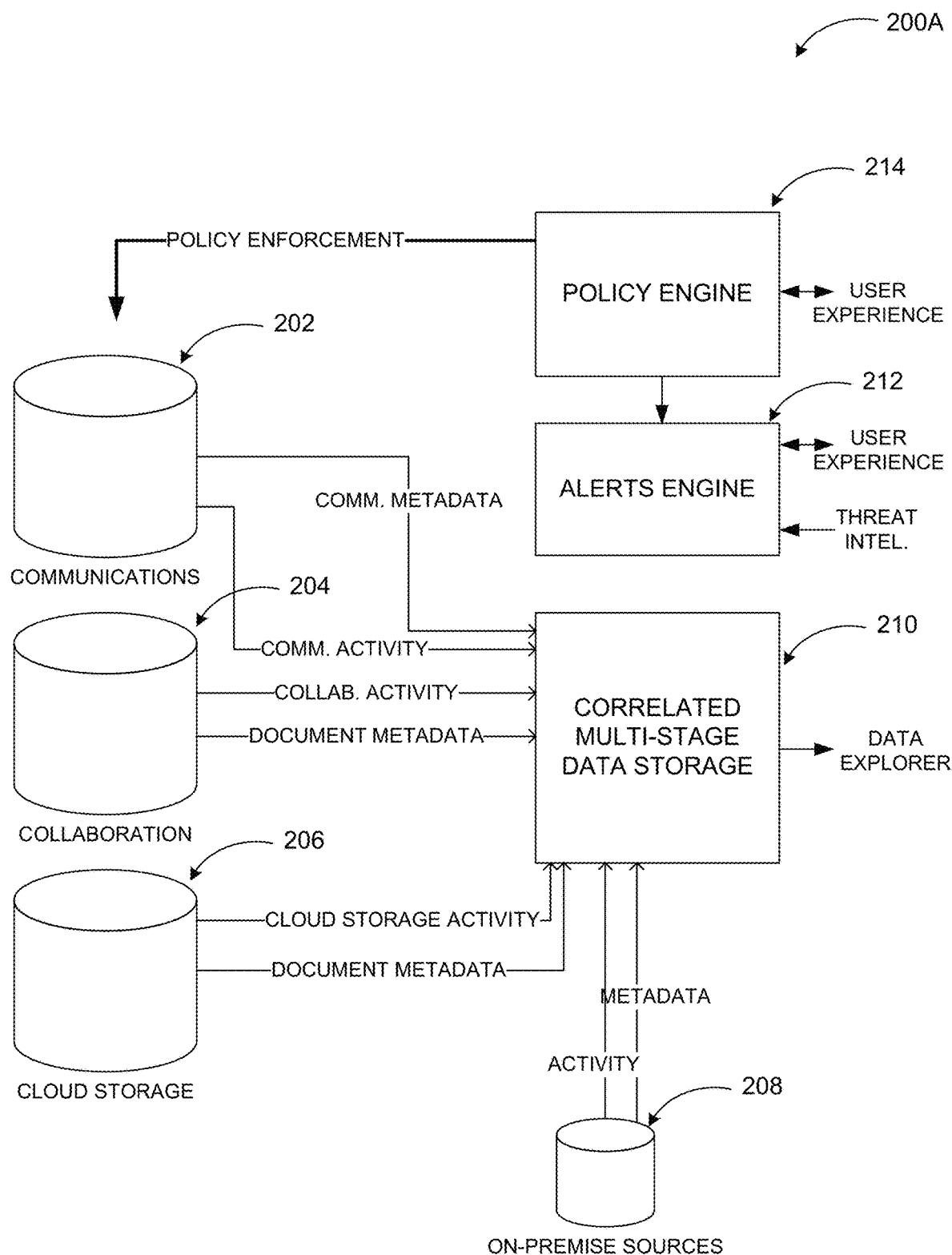
FIGS. 2A and 2B include display diagrams illustrating components and interactions of a security and compliance service providing real time pivoting on data to model governance properties.
Figure 2B:
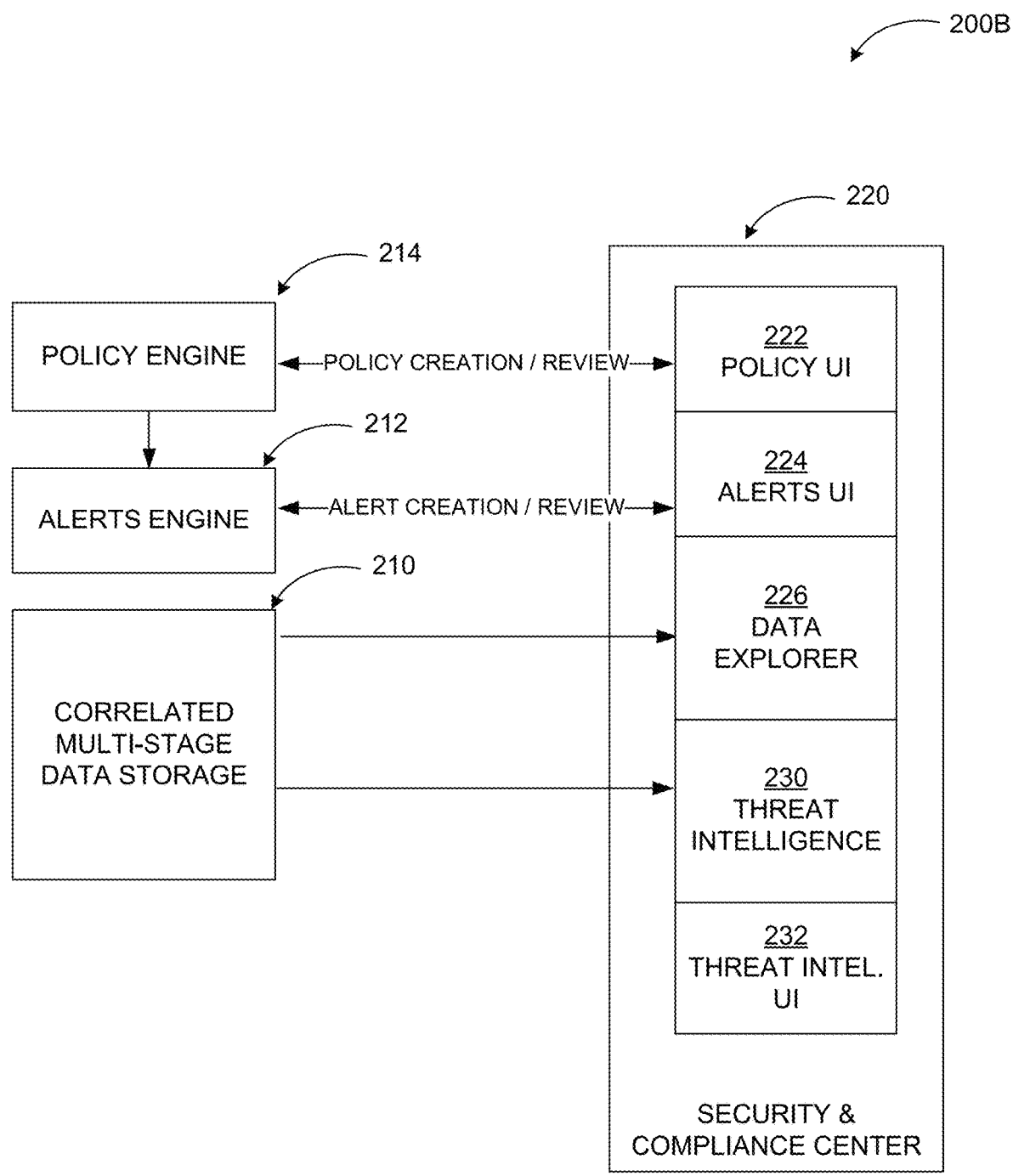

FIGS. 2A and 2B include display diagrams illustrating components and interactions of a security and compliance service providing real time pivoting on data to model governance properties.

Diagrams 200A and 200B show an example infrastructure for a comprehensive security and compliance service that may include among its components a data explorer module for providing real time, pivoting on data to model governance properties. In some examples, data to be analyzed, categorized, protected, and handled according to policies may come from a variety of sources such as a communications data store 202, a collaboration data store 204, and cloud storage 206. On-premise data sources 208 may also contribute to the data to be processed. A correlated, multi-stage data storage service 210 (also referred to as a data insights platform) may receive stored data, activities associated with the data, and metadata, and correlate the data at multiple levels based on the activities and metadata. For example, a policy defining sharing or retention schedules for all word processing documents or all marketing documents may be an overkill and consume unnecessary resources, result in false positives, etc. In a system according to embodiments, the broader data types may be categorized based on specific aspects such as who is accessing the data, where the data is being accessed from, whether the document include sensitive information, etc. Policies and remediation actions may be determined according to these more granular categories allowing a more accurate and efficient handling and protection of the data.

The larger infrastructure may also include an alerts engine 212 to determine and issue alerts based on threats or unacceptable data usage, and a policy engine 214 to determine and implement retention, handling, and protection policies. As shown in diagram 200B, the correlated, multi-stage data storage may be utilized by a multitude of modules such as a threat intelligence module 230 to manage internal and external threats and data explorer module 226 to identify categories of data and determine applicable policies and remediation actions for the identified data. User experiences such as threat intelligence user interface 232, alerts user interface 224, and policy user interface 222 may be provided as part of a security and compliance center 220 to present actionable visualizations associated with various aspects of the service and receive user/administrator input to be provided to the various modules. Various application programming interfaces (APIs) such as REST API may be used for exchange of communications among the different components of the system.

Figure 3:
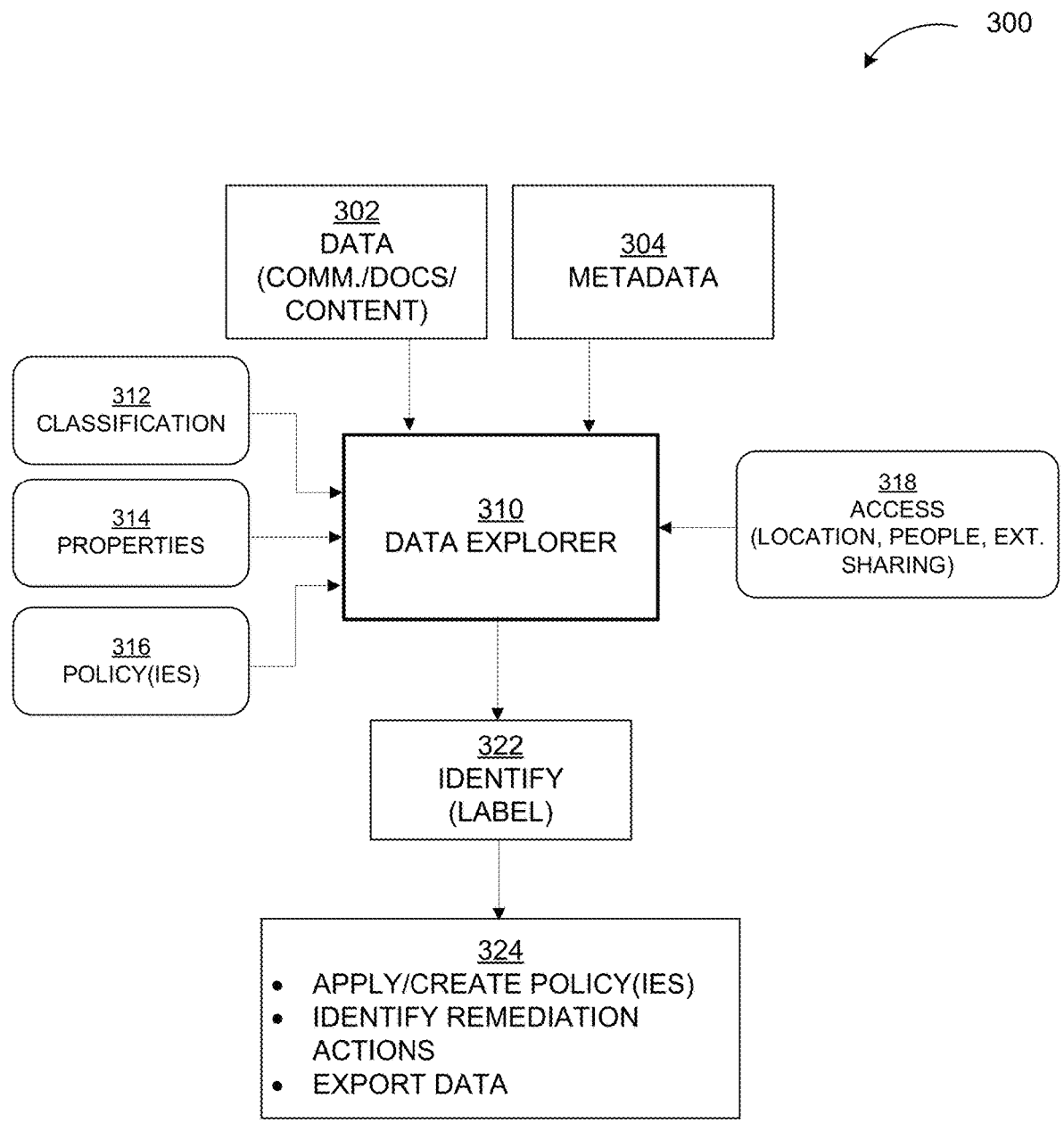
FIG. 3 includes a display diagram illustrating conceptually inputs and outputs of a data explorer module providing real time pivoting on data to model governance properties.

FIG. 3 includes a display diagram illustrating conceptually inputs and outputs of a data explorer module providing real time pivoting on data to model governance properties.

In the example configuration of diagram 300, a data explorer module 310 may receive as input data 302 and metadata 304. In other examples, activities associated with the data may also be provided as input or used by a data insights platform to correlate and evaluate the data. For identification of categories of data, classification 312, properties 314, and applied policies 316 may be provided along with access information 318.

Based on the received inputs, the data explorer module 310 may identify (or label) data 322, and determine applicable policies and remediation actions 324 based on the labels. The data explorer module 310 may also provide information such as reports to other modules and/or automatically implement some determined policies or remediation actions.

Classification 312 may include existing labels and sensitive data types, properties 314 may include data properties such as age, type, size. Applied policies 316 may include existing policies already associated with portions of the data. Access information 318 may include storage location, location of access to the data, frequency of access, types of accessing users or entities, organizational structures of users accessing the data, sharing types (external or internal), and similar information. The determined applicable policies may include retention policies, protection policies, handling policies, and comparable ones. In some examples, the applicable policy(ies) may be customized (tailored) based on a tenant profile, where the tenant profile includes one or more of an industry, a size, a geographical location, a hosted service ecosystem, a role, a regulatory requirement, and a legal requirement associated with the tenant.

In other examples, a pattern associated with the data and a usage of the data may be detected based on the analysis, an insight may be derived for the applicable policy based on the pattern and the application policy presented as a suggested policy for the data based on the derived insight. In further examples, the data explorer module may monitor changes to the data and the one or more of classification, property, applied policy, and access associated with the data, and then create a performance report based on the monitoring. The data explorer module may also re-evaluate the label, the applicable policy, and the remediation action for the data based on the performance report. The remediation actions may include implementation of a suggested policy and restriction of one or more of a delete action, a share action, a copy action, a move action, an anonymous link creation, a synchronization, a site creation, a created exemption, a permission modification, a purge of email boxes, a folder movement, a user addition, and/or a group addition.

Figure 4:
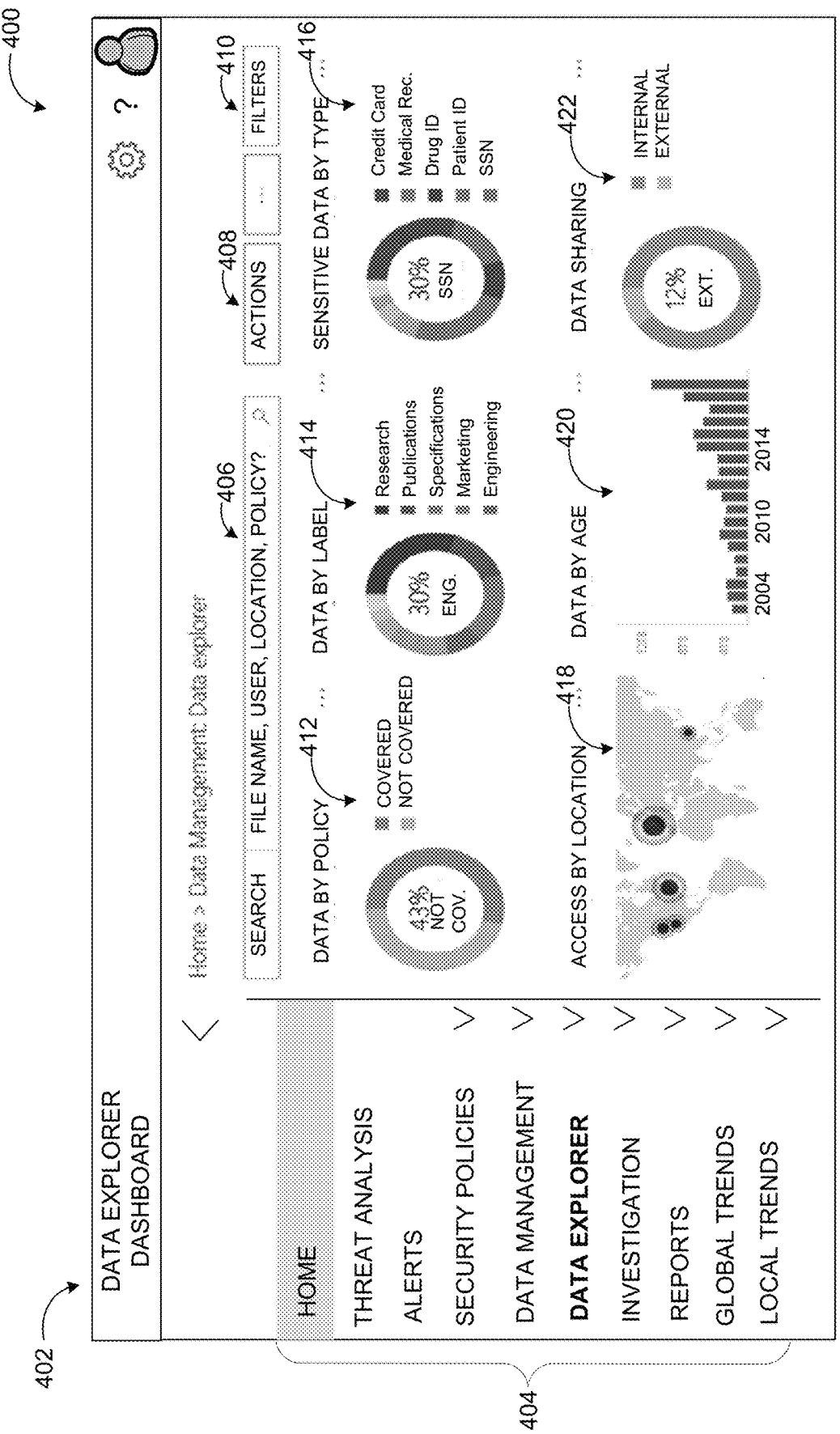
FIG. 4 includes a display diagram illustrating a data explorer dashboard with various visualizations on data attributes.

FIG. 4 includes a display diagram illustrating a data explorer dashboard with various visualizations on data attributes.

Diagram 400 illustrates an example dashboard through which actionable visualizations may be presented, actions/policies implemented, and monitored. As shown in the diagram, a client application may provide an administrator, for example, access to a user interface such as a dashboard 402, associated with a data explorer module of a hosted service or a separate protection service. The dashboard 402 may present summary and/or detailed information associated with data categories, threats, security and compliance configurations, analyses results, and configuration controls, for example. Among other things, the dashboard 402 may comprise a plurality of tabs 404 that each offer one or more security and compliance based features that may be managed by the tenant, administrators, and/or users through the dashboard 402. Example tabs 404 may include a home dashboard view, and additional views associated with threat analysis, alerts, security policies, data management investigation, reports, global trends, and local trends.

In the data explorer view, users may be enabled to search data under various labels through a search box 406, and view/select actions 408, filters 410, etc. Various visualizations may include data by policy 412, data by label 414, sensitive data by type 416, access by location 418, data by age 420, and data sharing 422, for example. The visualizations may include graphic representations such us bar charts, pie charts, maps, and other representations employing a variety of highlighting, color, textual, graphic, and shading schemes. Some or all of the visualizations may be actionable, that is, a user may drill down on data by clicking on elements of the visualization, see details, change filtering parameters, change visualization parameters, etc. For example, a default data by label visualization may display a top 5 or 10 labels. Users may reduce or increase the number, change the graphic representation, etc. In some embodiments, users may be enabled to combine visualizations. For example, access by location visualization may be combined with sensitive data type or policy visualization such that a new visualization providing an intersection of the selected attributes may be presented.

Figure 5A:
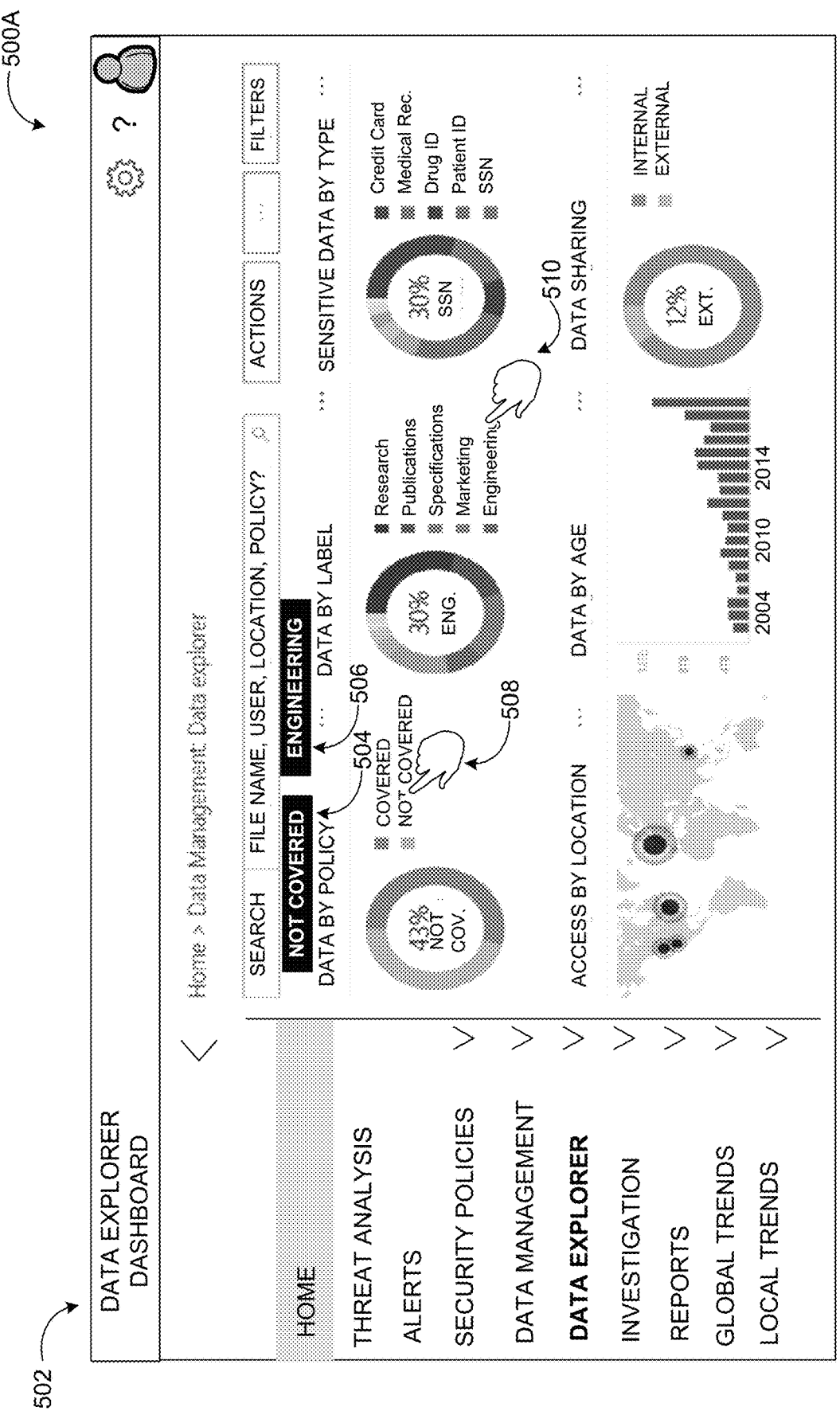
FIGS. 5A through 5C include display diagrams illustrating filtering of available data, and selection of a policy to be implemented through a data explorer dashboard.
Figure 5B:
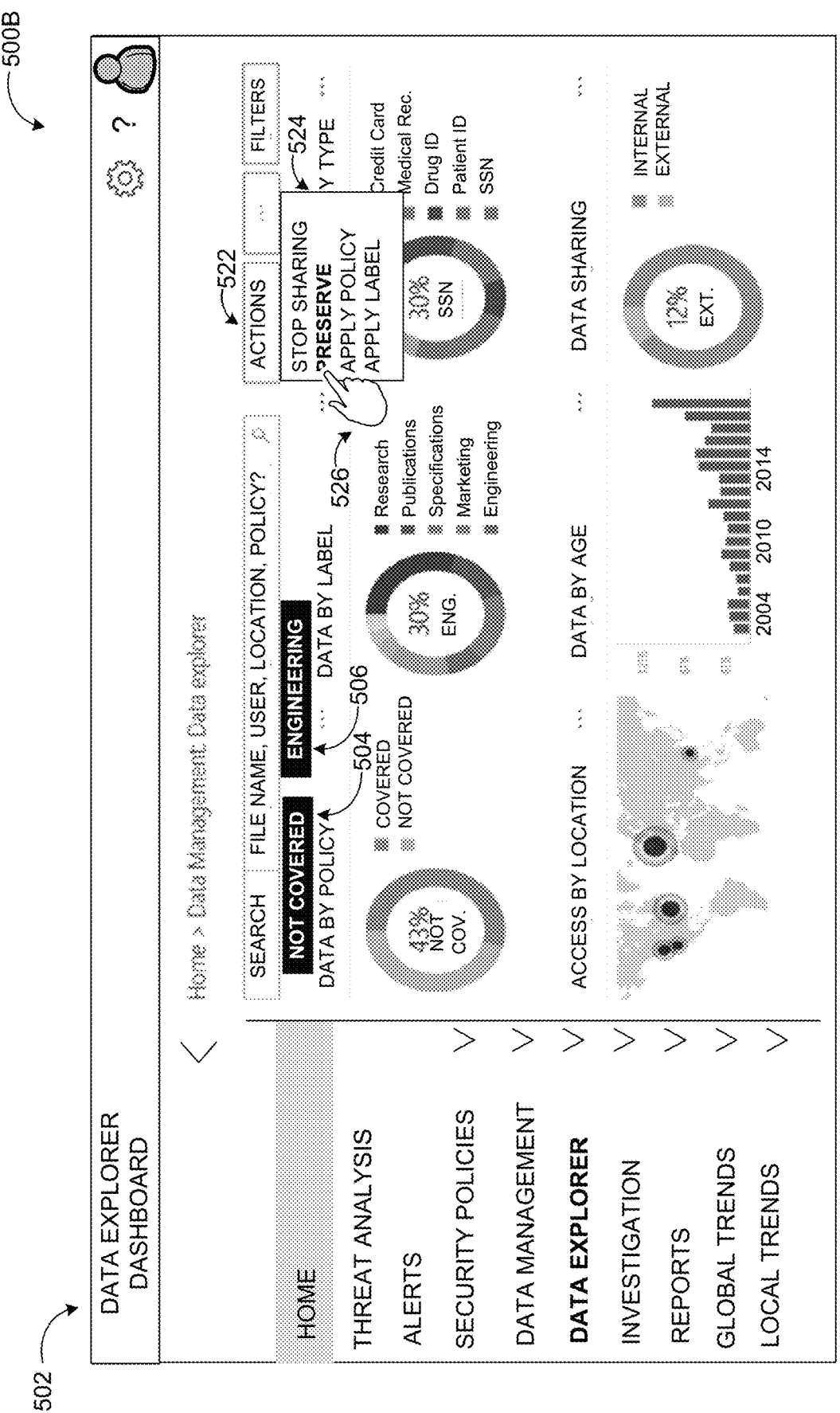
Figure 5C:
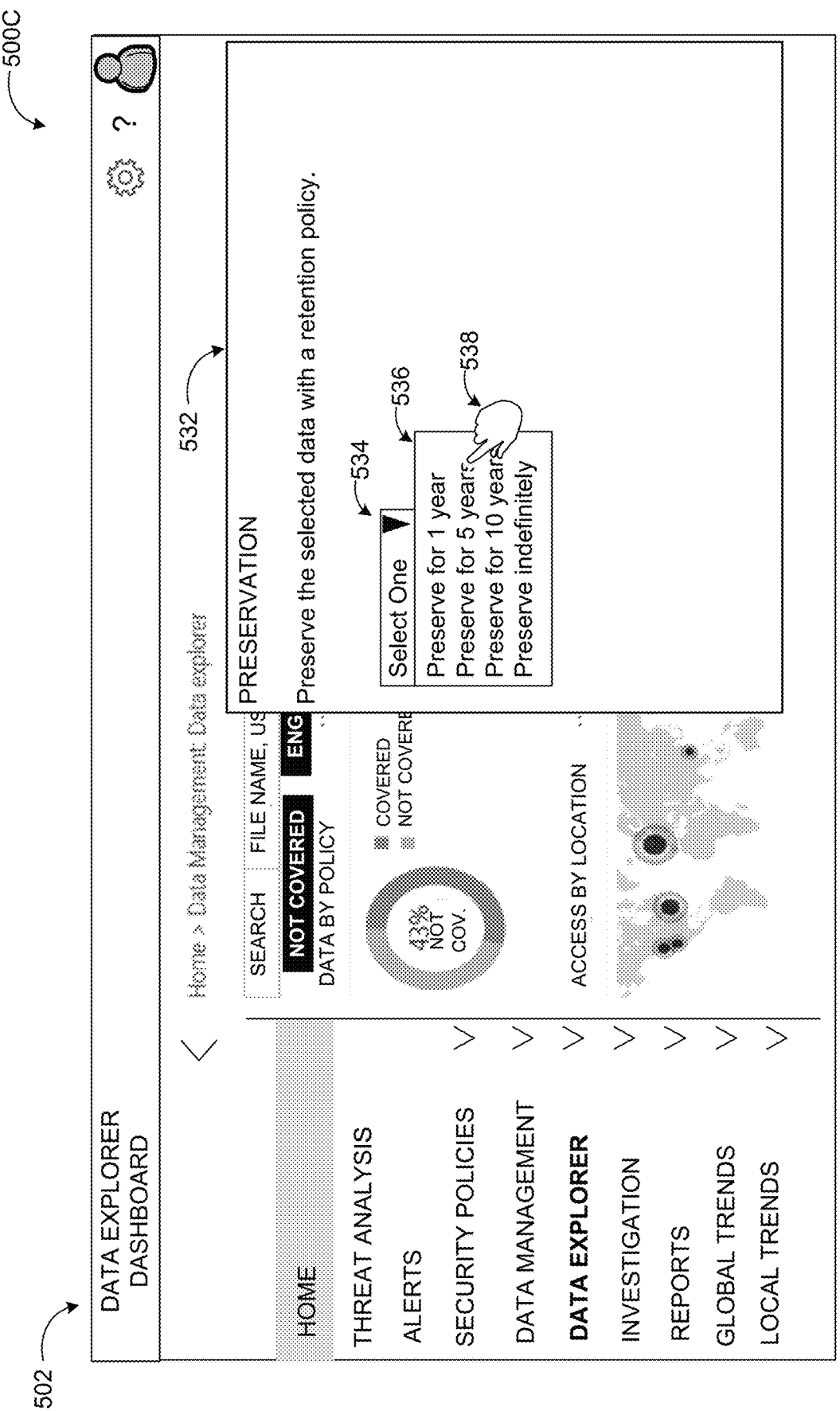

FIGS. 5A through 5C include display diagrams illustrating filtering of available data, and selection of a policy to be implemented through a data explorer dashboard.

Diagrams 500A through 500C show an example progression of filter selections, policy suggestion based on the selected data type, and implementation of a selected policy. In diagram 500A, a portion of data defined by two attribute filters may be selected. First selection 508 is data that is not covered by an existing policy (504) and second selection 510 is data labeled as engineering data (506). The filtering may be visually displayed. Upon selection of the data portion, the data explorer module may identify specific data (e.g., documents, communications, other content) that falls into the selected category and determine applicable remediation actions or policies.

As shown in diagram 500B, the determined actions/policies may be displayed in a menu 524. For example, a "stop sharing" action may be suggested along with a "preserve" action corresponding to a retention policy. Upon selection 526 of the "preserve" action, retention policy options 536 may be displayed for under a Select control 534 in a Preservation view 532. If the user selects (538) a 5-year retention option, the identified data (engineering data that is currently not covered by any policy) may be scheduled to be stored in the system for 5 years. Other policies and remediation actions may also be determined and presented based on the analysis and categories of data.

The dashboards 402 and 502 are not limited to the above described components and features. Various graphical, textual, coloring, shading, and visual effect schemes may be employed to provide real time pivoting on data to model governance properties through a dashboard.

The examples provided in FIGS. 1A through 5C are illustrated with specific systems, services, applications, modules, and displays. Embodiments are not limited to environments according to these examples. Real time pivoting on data to model governance properties may be implemented in environments employing fewer or additional systems, services, applications, modules, and displays. Furthermore, the example systems, services, applications, modules, and notifications shown in FIGS. 1A through 5C may be implemented in a similar manner with other user interface or action flow sequences using the principles described herein.

Figure 6:
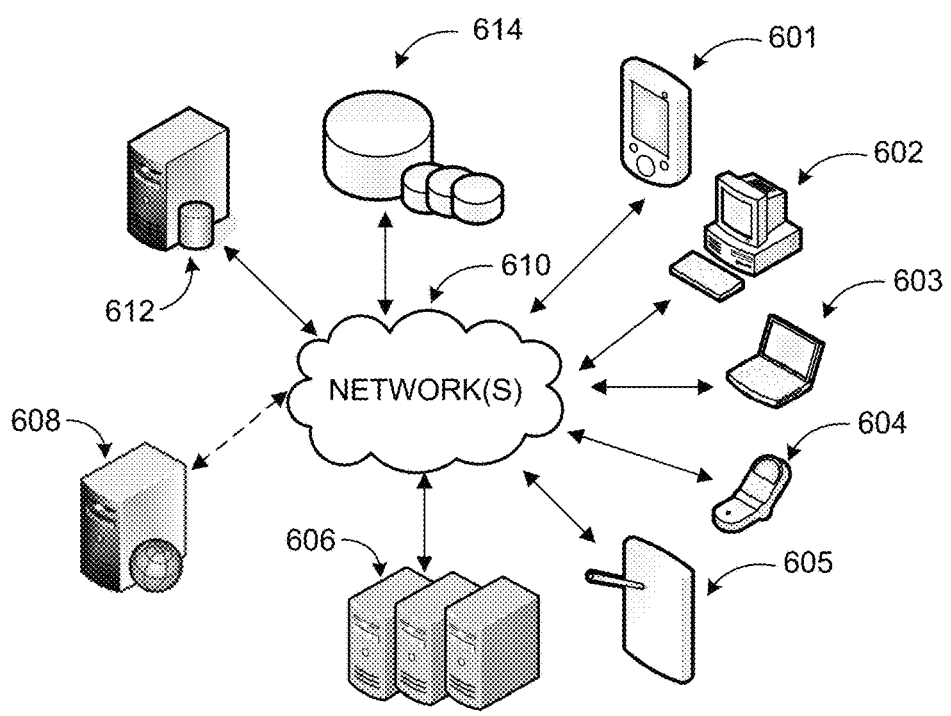
FIG. 6 is a networked environment, where a system according to embodiments may be implemented.

FIG. 6 is a networked environment, where a system according to embodiments may be implemented. A data explorer module as described herein may be employed in conjunction with hosted applications and services (for example, the client application 106 associated with the hosted service 114, or the protection service 126) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface, such as a dashboard, presented to users.

Client devices 601-605 are used to access the functionality provided by the hosted service or client application. One or more of the servers 606 or server 608 may be used to provide a variety of Services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology, Network(s) 610 may include a secure network such as an enterprise network, an unsecured network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide real time pivoting on data to model governance properties. Furthermore, the networked environments discussed in FIG. 6 are fir illustration purposes only. Embodiments are not limited to the example applications, engines, or processes.

Figure 7:
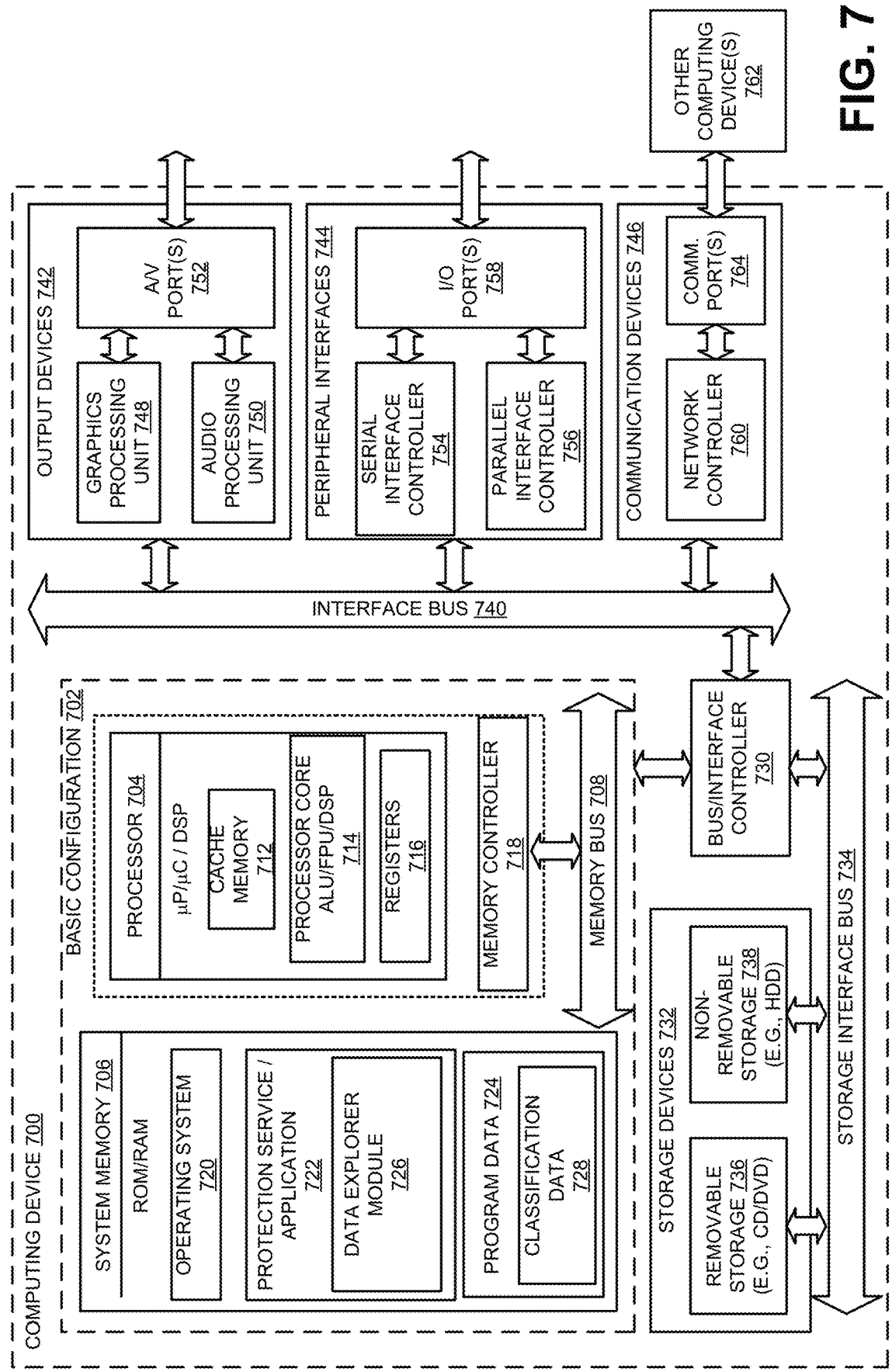
FIG. 7 is a block diagram of an example computing device, which may be used to provide real time pivoting on data to model governance properties.

FIG. 7 is a block diagram of an example computing device, which may be used to provide real time pivoting on data to model governance properties.

For example, computing device 700 may be used as a server, desktop computer, portable computer, smart phone, special purpose computer, or similar device, in an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a protection application or service 722, and program data 724. The protection application or service 722 may include a data explorer module 726, which may be an integrated module of the protection application or service 722. The security and compliance module 726 may be configured to aggregate and analyze data, metadata, and activities associated with a hosted service in order to detect data types and patterns and derive useful insights for applicable policies and/or configurations based on the data or pattern, from which a suggestion comprising a policy or configuration may be generated and presented to the tenant through a dashboard. The program data 724 may include, among other data, classification data 728, such as the user information, hosted service information, etc., as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide real time pivoting on data to model governance properties. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
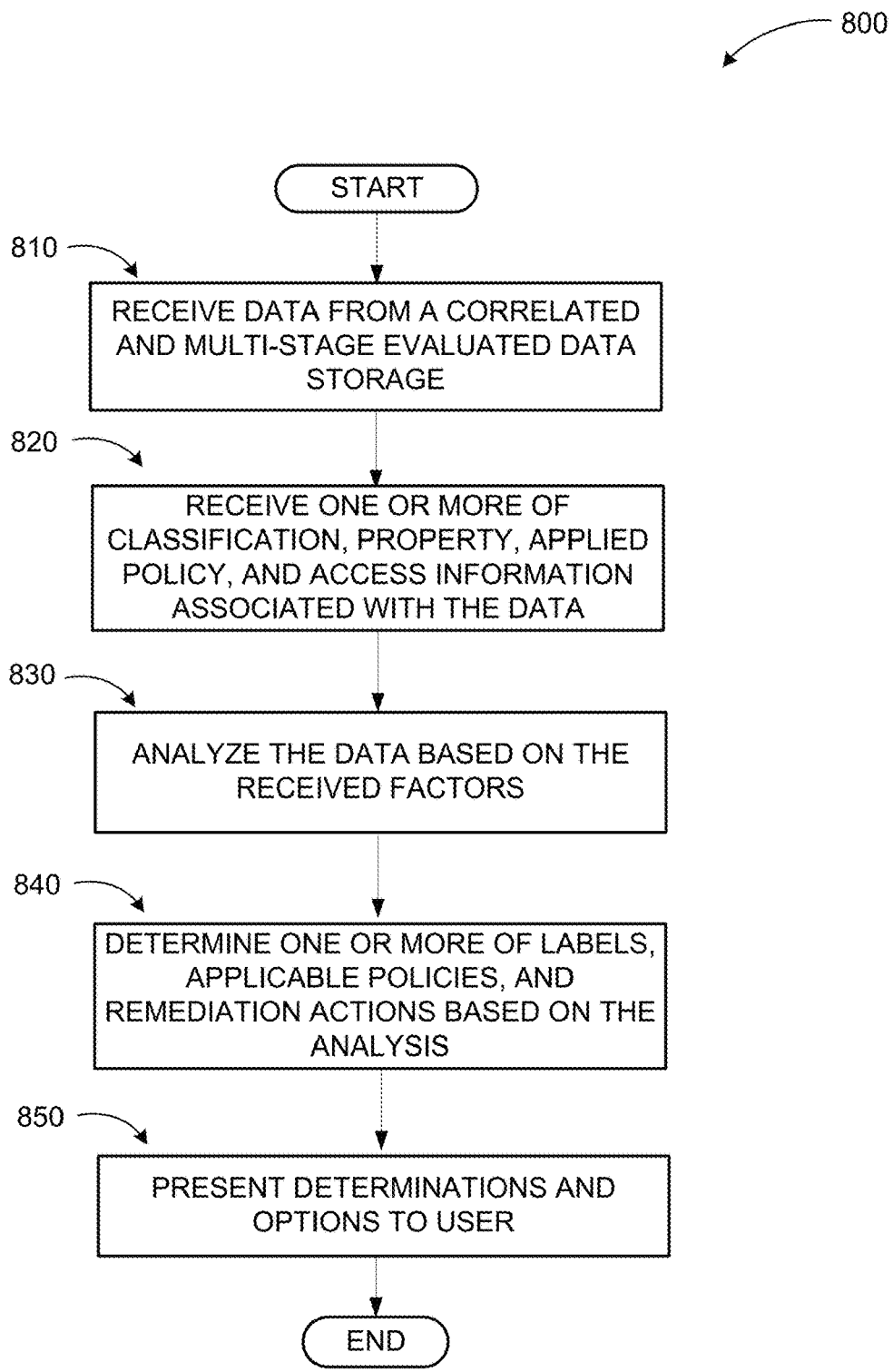
FIG. 8 illustrates a logic flow diagram of a method to provide real time pivoting on data to model governance properties, arranged in accordance with at least some embodiments described herein.

FIG. 8 illustrates a logic flow diagram of a method to provide real time pivoting on data to model governance properties. Process 800 may be implemented on a computing device, server, or other system. An example server may comprise a communication interface to facilitate communication between one or more client devices and the server. The example server may also comprise a memory to store instructions, and one or more processors coupled to the memory. The processors, in conjunction with the instructions stored on the memory, may be configured to provide real time pivoting on data to model governance properties.

Process 800 begins with operation 810, where data may be received from a correlated and multi-stage evaluation data storage. For example, a data insights platform correlating and evaluating available data such as communications, documents, and other content may provide a source to the data explorer module.

At operation 820, attribute information such as classification, property, applied policy(ies), and access to the data may be received. The attribute information may be used to analyze the data at operation 830. The attribute information may also be used to filter the data in presenting visualizations through a dashboard.

At operation 840, data may be identified (i.e., labels determined), one or more applicable policies may be determined, and/or one or more remediation actions may be determined based on the analysis results. The determinations may be presented to a user at operation 850 in form of actionable visualizations and options to perform actions on the data.

The operations included in process 800 are for illustration purposes. Real time pivoting on data to model governance properties may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing real time pivoting on data to model governance properties is described. The means may include a means for receiving information on one or more of classification, property, applied policy, and access associated with data stored in a correlated and multi-stage evaluated storage structure; a means for analyzing the data based on the received information; a means for determining one or more of a label, an applicable policy, and a remediation action for the data based on analysis results; and a means for presenting the determined one or more of the label, the applicable policy, and the remediation action through one or more actionable visualizations.

According to some examples, a method to provide real time pivoting on data to model governance properties is described. The method may include receiving information on one or more of classification, property, applied policy, and access associated with data stored in a correlated and multi-stage evaluated storage structure; analyzing the data based on the received information; determining one or more of a label, an applicable policy, and a remediation action for the data based on analysis results; and presenting the determined one or more of the label, the applicable policy, and the remediation action through one or more actionable visualizations.

According to other examples, the method may also include receiving to metadata associated with the data; and considering the metadata in the analysis. The data may include one or more of a document, a communication, and non-document content. Receiving the information on the classification may include receiving a label or a sensitive data type information associated with the data. Receiving the information on the property may include receiving an age and a type information associated with the data. Receiving the information on the applied policy may include receiving information associated with one or more existing policies already applied to the data. Receiving the information on the access may include receiving information associated with one or more of a storage location of the data, a location of a user accessing the data, an identity of a user or an entity accessing the data, and whether the data is shared internally or externally.

According to further examples, determining the applicable policy may further include detecting a pattern associated with the data and a usage of the data based on the analysis; deriving an insight for the applicable policy based on the pattern; and presenting the application policy as a suggested policy for the data based on the derived insight. The method may also include tailoring the suggested policy based on a tenant profile, where the tenant profile includes one or more of an industry, a size, a geographical location, a hosted service ecosystem, a role, a regulatory requirement, and a legal requirement associated with the tenant. The method may further include providing the determined one or more of the label, the applicable policy, and the remediation action to one or more modules of a security and compliance service. The method may also include monitoring changes to the data and the one or more of classification, property, applied policy, and access associated with the data; creating a per report based on the monitoring; and re-evaluating the one or more of the label, the applicable policy, and the remediation action for the data based on the performance report.

According to other examples, a server configured to provide real time pivoting on data to model governance properties is described. The server may include a communication interface configured to facilitate communication between another server hosting a security and compliance service, one or more client devices, and the server; a memory configured to store instructions; and one or more processors coupled to the communication interface and the memory and configured to execute a data explorer module. The data explorer module may be configured to receive information on one or more of classification, property, applied policy, and access associated with data stored in a correlated and multi-stage evaluated storage structure; receive metadata associated with the data; analyze the data based on the received information and metadata; determine one or more of a label, an applicable policy, and a remediation action for the data based on analysis results; and present a dashboard with one or more actionable visualizations representing distinct attributes of the data and the determined one or more of the label, the applicable policy, and the remediation action.

According to some examples, the remediation action may include one or more of implementation of a suggested policy and restriction of one or more of a delete action, a share action, a copy action, a move action, an anonymous link creation, a synchronization, a site creation, a created exemption, a permission modification, a purge of email boxes, a fielder movement, a user addition, and a group addition. The data explorer module may be further configured to present one of a new policy and a modified policy as the applicable policy based on the analysis results. The data explorer module may be further configured to automatically implement the remediation action. The data explorer module may also be configured to provide the analysis results to a threat intelligence module to identify threats to the data. The data explorer module may be further configured to provide the analysis results to an alert management module to manage alerts based on activity associated with the data.

According to further examples, a computer-readable memory device with instructions stored thereon to provide real time pivoting on data to model governance properties is described, where the instructions, when executed, configured to cause one or mare computing devices to perform actions. The actions may include receive attribute information for data stored in a correlated and multi-stage evaluated storage structure, where the attribute information is associated with one or more of classification, property, applied policy, and access associated; present a dashboard with one or more actionable visualizations representing distinct attributes of the data; receive a multiple attribute filtering of the data through the dashboard; analyze the filtered data based on the received attribute information determine one or more of a label, an applicable policy, and a remediation action for the data based on analysis results; and present the determined one or more of the label, the applicable policy, and the remediation action through the dashboard.

According to some examples, the attribute information may include one or more of a label, a sensitive data type, a data type, an age, a storage location of the data, a location of a user accessing the data, an identity of a user or an entity accessing the data, and whether the data is shared internally or externally. The data may include one or more of a document and a communication, and the one or more of the label, the applicable policy, and the remediation action may be determined based on a content of the document or the communication.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to model governance properties, the method comprising:
   receiving, a label of data stored in a storage structure, the label indicating a subject matter of the data;
   receiving access information, wherein the access information comprises an indicator of at least one selected from a group consisting of:
     a storage location of the data,
     a location of a client device configured to access the data,
     an identity of a client device configured to access the data, and
     a sharing indicator of whether the data is shared internally or externally;
   automatically determining a suggested policy governing how a client device is authorized to interact with the data, the determining based on
     the data,
     the label, and
     the access information;
   causing presentation of the determined suggested policy through an actionable visualization; and
   in response to receiving a selection of the actionable visualization, automatically applying the suggested policy to the data.

2. The method of claim 1, further comprising:
   receiving metadata associated with the data; and
   considering the metadata in the determining of the suggested policy.

3. The method of claim 1, wherein the data comprises one or more of a document, a communication, and non-document content.

4. The method of claim 3, further comprising receiving information associated with one or more casting policies already applied to the data.

5. The method of claim 1, wherein automatically determining the suggested policy further comprises:
   detecting, a pattern associated with the data and a usage of the data;
   deriving an insight for an applicable policy based on the pattern; and
   causing presentation of the applicable policy as the suggested policy for the data based on the derived insight.

6. The method of claim 5, further comprising:
   tailoring the suggested policy based on a tenant profile, wherein the tenant profile includes one or more of an industry, a size, a geographical location, a hosted service ecosystem, a role, a regulatory requirement, and a legal requirement associated with the tenant.

7. The method of claim 1, further comprising:
   providing the determined suggested policy governing how a client device is authorized to interact with the data of the data to one or more of a security and compliance service.

8. The method of claim 1, further comprising:
   monitoring changes to the data and the label and the access information for the data;
   creating a performance report based on the monitoring; and
   re-evaluating the suggested policy governing how a client device is authorized to interact with the data of the data based on the performance report.

9. A server configured to model governance properties, the server comprising:
   a memory configured to store instructions; and
   one or more processors configured, via execution of the instructions, to:
     receive a label of data stored in a storage structure, the label indicating a type of sensitive data included in the data;
     receive access information, wherein the access information comprises an indicator of at least one selected from a group consisting of:
       a storage location of the data,
       a location of a client device configured to access the data,
       an identity of a client device configured to access the data, and
       a sharing indicator of whether the data is shared internally or externally;
     automatically determine a suggested policy governing how a client device is authorized to interact with the data, the determining based on
       the data,
       the label, and
       the access information;
     cause presentation of the determined suggested policy through an actionable visualization; and
     in response to receiving a selection of the actionable visualization, automatically apply the suggested policy to the data.

10. The server of claim 9, wherein the suggested policy includes a restriction of one or more of a delete action, a share action, a copy action, a move action, an anonymous link creation, a synchronization, a site creation, a created exemption, a permission modification, a purge of email boxes, a folder movement, a user addition, and a group addition.

11. The server of claim 9, wherein the one or more processors are further configured to:
    cause presentation of one of a new policy and a modified policy as the suggested policy.

12. The server of claim 9, wherein the one or more processors are further configured to:
  automatically determine a remediation action and implement the remediation action.

13. The server of claim 9, wherein the one or more processors are configured to automatically determine the suggested policy further by:
  detecting a pattern associated with the data and a usage of the data;
  deriving an insight for an applicable policy based on the pattern; and
  causing presentation of the applicable policy as the suggested policy for the data based on the derived insight.

14. A computer-readable memory device with instructions stored thereon to model governance properties, the instructions, when executed, configured to cause one or more computing devices to perform actions comprising:
  receive a label of data stored in a storage structure, the label indicating a subject matter of the data;
  receive access information, wherein the access information comprises an indicator of at least one selected from a group consisting of:
    a storage location of the data,
    a location of a client device configured to access the data,
    an identity of a client device configured to access the data, and
    a sharing indicator of whether the data is shared internally or externally;
  automatically determine a suggested policy governing how a client device is authorized to interact with the data, the determining based on
    the data,
    the label, and
    the access information;
  cause presentation of the determined suggested policy through an actionable visualization; and
  in response to receiving a selection of the actionable visualization, automatically apply the suggested policy to the data.

15. The computer-readable memory device of claim 14, wherein the data includes one or more of a document and a communication, and the label and the access information is determined based on a content of the document or the communication.

16. The server of claim 9, wherein the one or more computing devices are further configured to:
  receive metadata associated with the data; and
  consider the metadata in the determining of the suggested policy.

17. The computer-readable memory device of claim 14, wherein the one or more processors are further configured to:
  receive metadata associated with the data; and
  consider the metadata in the determining of the suggested policy.

* * * * *